United States Patent [19]

Hutta

[11] Patent Number: 4,842,631
[45] Date of Patent: Jun. 27, 1989

[54] METHOD OF MAKING CARBON DIOXIDE AND CHLORINE FREE FLUORIDE-BASED GLASS

[75] Inventor: Joseph J. Hutta, Groton, Mass.

[73] Assignee: The United States of America as represented by the Secretary of the Air Force, Washington, D.C.

[21] Appl. No.: 213,007

[22] Filed: Jun. 20, 1988

[51] Int. Cl.$^4$ .................... C03B 37/027; C03C 3/32
[52] U.S. Cl. ............... 65/32.5; 65/DIG. 16; 65/32.1; 501/30; 501/40
[58] Field of Search ............... 65/32.1, 32.5, DIG. 16; 501/30, 40

[56] References Cited

U.S. PATENT DOCUMENTS

| | | | |
|---|---|---|---|
| 4,141,741 | 2/1979 | Lucas et al. | 106/48 Q |
| 4,341,873 | 7/1982 | Robinson et al. | 501/40 |
| 4,380,588 | 4/1983 | Mitachi et al. | 501/37 |
| 4,388,097 | 6/1983 | Turk et al. | 65/64 |
| 4,432,891 | 2/1984 | Susman et al. | 501/40 X |
| 4,445,755 | 5/1984 | Ohsawa et al. | 350/96.34 |
| 4,539,032 | 9/1985 | Tran et al. | 65/32 |
| 4,560,667 | 12/1985 | Lucas et al. | 501/30 X |
| 4,597,786 | 7/1986 | Nakai et al. | 65/2 |
| 4,652,438 | 3/1987 | Folweiler | 423/489 |
| 4,659,352 | 4/1987 | Robinson | 65/2 |
| 4,666,486 | 5/1987 | Hutta | 65/DIG. 16 |
| 4,666,870 | 5/1987 | Poulain et al. | 501/30 X |

FOREIGN PATENT DOCUMENTS 9092936  5/1984  Japan ............... 65/DIG. 16

Primary Examiner—Arthur Kellogg
Attorney, Agent, or Firm—Stanton E. Collier; Donald J. Singer

[57] ABSTRACT

An improved method of making carbon dioxide and chlorine free fluoride-based glass wherein the atmosphere in the furnace enclosure is sulphur hexafluoride gas at a positive over pressure.

1 Claim, 1 Drawing Sheet

METHOD OF MAKING CARBON DIOXIDE AND CHLORINE FREE FLUORIDE-BASED GLASS

STATEMENT OF GOVERNMENT INTEREST

The invention described herein may be manufactured and used by or for the Government for governmental purposes without the payment of any royalty thereon.

BACKGROUND OF THE INVENTION

The present invention relates to an improved method of making fluoride-base glass free of certain contaminants, and in particular, free of carbon dioxide and chlorine. Considerable effort has been expended to develop heavy metal fluoride glasses ("HMFG") as a viable family of infrared-transparent optical-materials for application as fiber waveguides and as bulk optical components. The specific characteristics of these materials and their advantages in terms of optical performance over silica and other oxide-based glasses are well known.

Because of fundamental physio-chemical differences, the HMFG are not as easily formed into bulk components (e.g., plates, discs, rods) as are many oxide-based glasses. For example, the viscosity (0.1–1 poise) of most heavy metal fluoride melts near the liquidus (800°–1000° C.) is similar to that of water. This high fluidity, coupled with the proximity of the glass-transition ($T_g \sim 320°$ C.) and crystallization temperatures ($T_g \sim 400°$) in many HMFG compositions, translates into an oftentimes marked tendency for melts to devitrify or crystallize upon cooling. In addition, the presence of specific impurities such as hydroxyl chlorine species, and trace oxides may be instrumental in the nucleation and growth of crystallites.

These problems are often exacerbated by the melting techniques traditionally utilized to prepare HMFG which involve the use of oxide starting materials converted in situ to fluorides via heating with ammonium bifluoride or by the use of reactive atmospheres such as carbon tetrachloride/argon. While the conventional method represents a simple and straightforward approach to glass preparation, it has encountered difficulties in reproducing physical and optical properties from batch to batch. Moreover, such "conventionally" prepared samples often contain inclusions, crystallites, partial substitution of chlorine for fluorine or incorporation of particularly carbon dioxide, which degrades transmission near the 2350 cm$^{-1}$ wavelength region.

SUMMARY OF THE INVENTION

The present invention sets forth a process of forming heavy metal fluoride glasses that overcomes the problems noted hereinabove.

The present process is directed to typical heavy metal fluoride glasses of the compositions:

[XF$_4$+BaF$_2$+LaF$_3$+AlF$_3$+YF]

where X is either zirconium or hafnium and Y can represent sodium, lithium, lead, indium, or no addition.

For example, the melt mixture may contain multicomponent fluorides, or, alternatively, the mixed oxides or oxyfluorides plus ammonium bifluoride (NH$_4$HF$_2$) in a crucible, preferably made of a nonreactive inert precious metal such as platinum, platinum alloys or gold but also including vitreous or pyrolytic carbon.

This crucible is placed within a furnace contained within a vacuum chamber. The chamber is evacuated to around 110 torr and then backfilled with sulphur hexafluoride (SF$_6$) to a slight positive pressure. The mixture is then rapidly heated to about 800°±10° C., held there at temperature for a brief period then rapidly cooled.

It is therefore one object of the present invention to provide a method of making carbon dioxide and chlorine free high optical quality fluoride-based glass.

It is another object of the present invention to provide a method of making fluoride-based glass in a chamber having carbon components therein such as support members, susceptors, heat shields and the like.

It is another object of the present invention to provide a method of making fluoride-based glass in which the typically used atmosphere of carbon tetrachloride/argon is not present.

It is another object of the present invention to provide an atmosphere which is non-poisonous in the method of making fluoride based glass.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

The present invention is a process of providing, high optical quality heavy metal fluoride glasses that lack devitrification, straie, seed, internal bubbles, crystalline inclusions, dissolved CO$_2$ and chlorine contamination or other defects and inhomogeneities common in glasses of this type.

Figure 1:
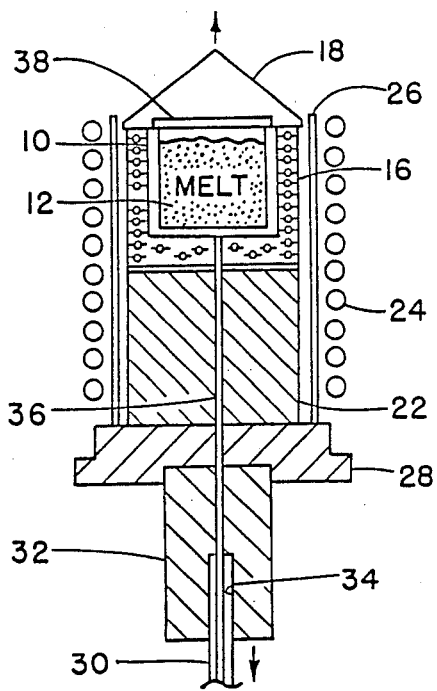
FIG. 1 illustrates by a partial view the glass-forming apparatus for the present invention.

Referring to FIG. 1, the chemical constituents in powder, lump or crystal form or cullet fragments of the heavy metal fluoride glass (HMFG) composition are placed in a crucible 10 to form a charge 12. Crucible 10 may be made of a material resistant to attack by molten fluorides, preferably platinum or platinum alloy but also including gold and carbon. Crucible 10 is placed in container 16 that is shaped like a cup and made of carbon, for example. Although container 16 is used as a heat susceptor, the process does not require its use. Container 16 is connected by means of hanger 18 to a vertically movable means, not shown. Container 16 rests upon a support 22 that may be carbon. Support 22 rests upon graphite pedestal 28. A lower retractor shaft 30 is connected to a support 32 that holds pedestal 28. A hole 34 through shaft 30, support 32 pedestal 28, and cylinder 22 allows a thermocouple 36 therein to be held inclose contact with crucible 10. The above items are placed within a closed furnace chamber.

The important features of the above apparatus are the ability to quickly remove crucible 10 from the source of heat such as coil 24 and cylinder 22, being able to immediately cool melt charge 12 by instantaneous termination of electric power to induction coil 24, and being able to adjust the separation between crucible 10 and support cylinder 22 that acts like a diminishing heat source after heating induction coil 24 is turned off.

Induction coil 24 is made of copper tubing and kept from melting by a constant flow of chilled 40° F. water. This flow continues after power shutoff but is not necessary to the glass formation process.

The furnace is enclosed in a vacuum chamber which is evacuated to about 110 Torr after which the chamber is backfilled with sulfur hexafluoride ($SF_6$) gas to a slight overpressure and allowed to flow through the apparatus during processing.

This feature avoids introduction of carbon dioxide and chlorine into the melt and degrading the optical quality of the subsequent solid (glass) product. It also eliminates or minimizes the combination of oxygen with carbon furnace parts to form carbon monoxide or carbon dioxide and chlorine which ordinarily dissolves in the melt and degrades the resulting glass product. It further avoids entirely the widely-used carbon tetrachloride/argon reactive atmosphere processing (RAP) approach responsible for carbon dioxide contamination of fluoride glasses.

This process is not limited to the ZBLA/HBLA fluoride compositions given above, but can be applied to all other fluoride glasses, and even chloride glasses, with only slight modification of procedure.

In making up a batch composition from the components, either the anhydrous fluorides or the oxides or mixtures of the two can be used. Where oxides are present, the mixture must be given a fluorinaton treatment. This can be done by introducing an atmosphere of fluorine-containing vapor. This can be HF gas or addition of ammonium bifluoride ($NH_4HF_2$). The need for fluorination can be obviated by using the anhydrous fluorides as starting material. This is the preferred approach, although the use of oxides or mixed oxides/fluorides is less expensive and may be preferred for commercial production.

In this embodiment, the sealed furnace chamber was evacuated to about 110 Torr by means of a standard laboratory mechanical vacuum pump. Evacuation was then terminated and the furnace chamber was backfilled with a charge of sulphur hexafluoride gas drawn through a cylinder packed with a commercial desiccant (DRIERITE) and through concentrated sulphuric acid ($H_2SO_4$), connected in tandem, for the purpose of removing any water ($H_2O$) that might be present.

The heating procedure consisted of rapidly raising the temperature of the glass composition to complete melting and homogenization at about 800°±10° C., holding at that temperature for about 5 minutes, then rapidly cooling the molten mixture by turning off the furnace power or removing the melt from the source of heat. A high cooling rate is desirable. In the present embodiment, cooling rates of around 65° C. per minute on cooling through the 600° to 500° C. temperature region are effective in producing high quality glass. See U.S. Pat. No. 4,666,486. Rates as high as 81° per minute and as low as 61° per minute have produced high quality glass. In practice, the 600° to 500° C. temperature region appears to be critical with regard to the onset of crystallization and it must be traversed as quickly as possible as an additional factor in producing high optical quality HMFG glass. The above applies, in particular, to ZBLA, HBLA and ZBLAN. The cooling rates and critical temperatures may be somewhat different for other HMFG compositions. The resulting clear glass ingot is removed from the crucible or mold; the ingot is subsequently annealed for three hours at 280° C. near the glass transition point, Tg, and then cooled to room temperature at a rate of 0.3° C./min.

The glass specimens prepared were water-white, transparent, straie-free, and appear to have an excellent optical homogeneity.

In view of the applications envisioned for HMFG, their optical behavior in the 1-8 micron region of the spectrum is of particular significance. Previous experience with ZBLA-type compositions prepared by different preparation methods had indicated considerable variation in sample optical quality and properties and displayed undesirable mid-infrared optical effects such as $CO_2$, OH, and oxide absorption bands. Specimens prepared by the present invention appear to have circumvented many of these problems and show a high degree of uniformity in their mid-IR optical characteristics.

Figure 2:
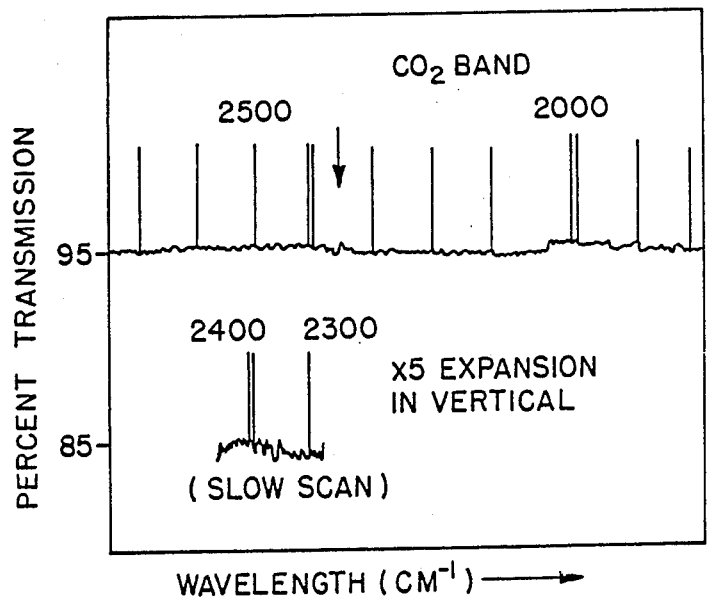
FIG. 2 illustrates a sample curve of transmission versus wave number about the area of interest of the present invention.

As a further demonstration of the superior optical quality of heavy metal fluoride glass specimens made in this invention, a transmission curve for a specimen of ZBLA is shown in FIG. 2.

In addition to its wide range in transparency from the near-UV to the mid-IR (from 0.3 to about 5.5 microns), this specimen, in contrast to heavy metal fluoride glasses made by conventional and carbon tetrachloride reactive atmosphere processing (RAP) techniques, shows no absorption (over background) at 2350 $cm^{-1}$ wavelength due to $CO_2$ nor does it display a 'shoulder' on its infrared edge. Nonvisibility of He-Ne laser beam propagated through this specimen further attests to its superior optical quality, total homogeneity and absence of scattering sites.

Clearly, many modifications and variations of the present invention are possible in light of the above teachings and it is therefore understood, that within the inventive scope of the inventive concept, the invention may be practiced otherwise than specifically claimed.

What is claimed is:

1. A process of manufacturing a bulk heavy metal fluoride glass having minimal carbon dioxide and chlorine therein, said process comprising the steps of:

obtaining constituent fluoride compounds of said heavy metal fluoride glass in as pure a form as possible;

weighing each of said compounds to obtain a desired composition of said heavy metal fluoride glass;

mixing said compounds together to form said desired composition;

forming a charge of said composition;

loading a crucible with said charge;

placing said crucible in a furnace enclosure;

sealing said furnace;

evacuating said furnace enclosure;

backfilling said furnace with sulphur hexafluorde gas;

quickly raising a temperature of said charge above said fusion temperature to insure admixture of molten constitutent compounds of said charge;

holding said charge at this higher temperature for a short period of time, said charge reaching said higher temperature in less than two hours from the start of said heating; and lowering a temperature of said charge from said high temperature in a short period of time to a temperature less than said fusion temperature, said charge forming a bulk glass.

* * * * *

UNITED STATES PATENT AND TRADEMARK OFFICE
CERTIFICATE OF CORRECTION

PATENT NO. : 4,842,631

DATED : June 27, 1989

INVENTOR(S) : Joseph J. Hutta

It is certified that error appears in the above-identified patent and that said Letters Patent is hereby corrected as shown below:

Col. 1, line 17, delete "-" between "optical and "material".

Col. 2, line 59, insert a -- -- being a space between "in" and "close".

Signed and Sealed this

Fifth Day of June, 1990

Attest:

HARRY F. MANBECK, JR.

*Attesting Officer*     *Commissioner of Patents and Trademarks*